United States Patent
Hass et al.

(10) Patent No.: US 7,228,927 B2
(45) Date of Patent: Jun. 12, 2007

(54) VEHICLE PROTECTION AGAINST THE EFFECT OF A LAND MINE

(75) Inventors: Frank Hass, Wendtorf (DE); Eitel Runow, Bonebuttel (DE)

(73) Assignee: Rheinmetall Landsysteme GmbH, Kiel (DE)

( * ) Notice: Subject to any disclaimer, the term of this patent is extended or adjusted under 35 U.S.C. 154(b) by 86 days.

(21) Appl. No.: 11/055,772

(22) Filed: Feb. 11, 2005

(65) Prior Publication Data
US 2005/0284682 A1    Dec. 29, 2005

(30) Foreign Application Priority Data
Feb. 11, 2004   (DE) .................. 10 2004 024 819
May 28, 2004    (DE) .................. 10 2004 026 237

(51) Int. Cl.
*B60K 1/00*    (2006.01)
(52) U.S. Cl. .................. 180/65.2; 89/36.08; 89/36.09
(58) Field of Classification Search ............... 180/65.2, 180/14.2, 14.4, 14.7, 14.5, 311, 313; 89/36.01, 89/36.05, 36.08, 36.09; 280/33.991, 785
See application file for complete search history.

(56) References Cited

U.S. PATENT DOCUMENTS

| | | | | |
|---|---|---|---|---|
| 2,716,040 A | * | 8/1955 | Barenyi ................. | 296/193.01 |
| 4,031,807 A | | 6/1977 | Boyer | |
| 4,280,393 A | | 7/1981 | Giraud et al. | |
| 4,351,558 A | * | 9/1982 | Mueller ................. | 296/203.01 |
| 4,368,793 A | * | 1/1983 | Igarashi ................. | 180/14.4 |
| 4,534,267 A | | 8/1985 | Fagel | |
| 4,878,451 A | * | 11/1989 | Siren ................. | 440/12.66 |
| 4,881,756 A | * | 11/1989 | Kumasaka et al. ......... | 280/785 |
| 5,176,213 A | | 1/1993 | Kawai et al. | |
| 5,245,738 A | * | 9/1993 | Johnson ................. | 29/413 |
| 5,401,056 A | * | 3/1995 | Eastman ................. | 280/785 |
| 5,558,588 A | * | 9/1996 | Schmidt ................. | 475/5 |
| 5,663,520 A | * | 9/1997 | Ladika et al. ............. | 89/36.08 |

(Continued)

FOREIGN PATENT DOCUMENTS

DE    25 27 100    2/1976

(Continued)

OTHER PUBLICATIONS

German Communication dated Mar. 1, 2005.

(Continued)

*Primary Examiner*—Christopher Bottorff
(74) *Attorney, Agent, or Firm*—Griffin & Szipl, P.C.

(57) ABSTRACT

A vehicle with protection against the effects of an exploding land mine is provided, in which a military wheeled vehicle is provided with wheel axels and drives built into front and/or rear building blocks. The vehicle is divided into multiple building blocks, although a three block construction is desirable (i.e., a front building block, a rear building block, and a main building block). A residual mobility of a remaining portion of the vehicle is preserved, even though one of the front building block or the rear building block is separated from the main building block due to the explosive shock wave generated by driving over and detonating a land mine, because each of the front building block and the rear building block has a drive for rotating the wheel axel connected to the block.

18 Claims, 3 Drawing Sheets

U.S. PATENT DOCUMENTS

| | | | |
|---|---|---|---|
| 5,866,839 A * | 2/1999 | Ohayon | 89/36.08 |
| 6,216,807 B1 * | 4/2001 | Eckhoff | 180/6.7 |
| 6,435,071 B1 * | 8/2002 | Campbell | 89/36.08 |
| 6,617,703 B2 * | 9/2003 | Matsubara et al. | 290/40 C |
| 6,779,431 B2 * | 8/2004 | Honlinger | 89/36.08 |
| 6,892,621 B2 | 5/2005 | Grosch | |
| 7,007,761 B1 * | 3/2006 | Johnson, IV | 169/24 |

FOREIGN PATENT DOCUMENTS

| | | |
|---|---|---|
| DE | 3119786 A1 | 12/1982 |
| DE | 32 06 794 A1 | 9/1983 |
| DE | 37 19 289 C1 | 12/1988 |
| DE | 19718709 A1 | 11/1997 |
| DE | 19653283 C1 | 6/1998 |
| DE | 196 19 865 C2 | 7/1999 |
| DE | 19631715 C2 | 1/2000 |
| DE | 10233274 A1 | 2/2004 |
| FR | 2 276 552 | 1/1976 |
| FR | 2 510 737 | 2/1983 |
| WO | WO 02/47958 A2 | 6/2002 |

OTHER PUBLICATIONS

European Search Report in corresponding EP 04 02 9313 dated May 10, 2005.

* cited by examiner

VEHICLE PROTECTION AGAINST THE EFFECT OF A LAND MINE

This application claims priority under 35 U.S.C. § 119 to German Applications Nos. DE 10 2004 024 819.2 and DE 10 2004 026 237.3, both of which are incorporated herein by reference in their entirety.

FIELD OF THE INVENTION

The invention relates to a vehicle equipped with protection against the effect of a land mine explosion. In particular, the present invention relates to an armored vehicle for generally protecting personnel, as well as the vehicle housing, in armored vehicles against the effect of explosions of mines located in the ground.

BACKGROUND OF THE INVENTION

Vehicles known in this respect are two and multi-axeled vehicles such as, for example, armored personnel vehicles and the like.

These vehicles have in their chassis, as a rule, a flat underbody with ground clearance between the underbody and the ground that is as high as possible, and that is secured by correspondingly designed gear or chain drive works. In this way, the vehicle can move forward in a relatively unhindered manner as possible, even in cross country terrain. Unfortunately, the explosive pressure effect of a mine exploding under these vehicles acts on the relatively large surface area of the vehicle or floor pan, thereby deforming and damaging the same. Thus, the explosive pressure effect of the mine can cause significant damage to the vehicle and its occupants.

It is known from the disclosure of German Document DE 31 19 786 A1 to protect against mines by positioning flat armor elements on the underside of the vehicle.

In German Document DE 196 31 715 C2, a vehicle protection system against landmines is described that provides a vehicle floor with a wedge or V-shaped design reflector, wherein in the free volume between the deflector and the underside of the vehicle a fillable gas sack can be positioned for support from the inside of the reflector. The fillable gas sack provides a counter action against an explosion, thereby providing the vehicle with additional protection against landmines.

In German Document DE 196 53 283 C1, an armoured fighting vehicle crew compartment is described wherein a space cell is separately, elastically hung as a crew space in the vehicle housing in order to overcome the shock effects from explosions that act on the vehicle from outside. In this way, the elastically hung crew space provides protection for the personnel in the vehicle.

Unpublished German Document DE 102 59 918.1, which corresponds to U.S. patent application Ser. No. 10/739,947 to Grosch, describes providing a mine protection device, particularly for wheeled vehicles, in which a detection signal from an ignition and calculation unit is sent out in response to a detected shock wave/percussion wave or blast wave. The ignition and calculation unit is connected to a pyrotechnical separation element, and the sending of the detection signal to the pyrotechnical separation element leads to the separation of a wheel construction group, or just the wheel, from the vehicle structure. The pyrotechnic separation of the support structure can take place using a cutting charge, or a suitable design of a separation point with pyrotechnic separation screws can be used.

A vehicle for traveling through hostile environments is described in WO 02/47958 A2 in which a hydraulically driven motor is provided on each of the wheels. Thus, when a shock wave leads into a wheel, following detonation of an overrun mine, in the worst case the explosion results in the separation of the wheel from the vehicle. However, residual mobility is achieved because the other wheels each have an individual drive and continue to operate to move the vehicle.

An armored vehicle built from individual single segments is described in German Document DE 102 33274 A1. The armored vehicle is comprised of two segments, (i) a driving segment and (ii) a mission segment, and electrical drive motors are present in the wheel hubs of both segments. In the rear mission segment, batteries for supplying the drive motors are disposed.

It is an object of the present invention to construct a mine protection system that preserves residual mobility for the vehicle when the vehicle experiences a defect (i.e., structural damage) caused by the detonation of a run-over mine, or the like. It is another object of the present invention to provide both protection for the effects of landmine explosion and residual mobility to a residual portion of a damaged vehicle while overcoming the limitations of the prior art military vehicles.

SUMMARY OF THE INVENTION

These objects are solved, according to the one embodiment of present invention, by the characteristic features of an armored wheeled vehicle with protection against effects of a land mine, comprising: (a) multiple building blocks including: (i) a front building block having at least one wheel axel; (ii) a rear building block having at least one wheel axel; and (iii) a main building block, wherein the front building block is releasably fastened by first means for connecting to a front portion of the main building block and the rear building block is releasably fastened to a rear portion of the main building block by second means for connecting to the main building block; (b) a combustion motor operatively connected to rotate at least one of the wheel axel of the front building block and the wheel axel of the rear building block, wherein the combustion motor is disposed in either the front building block or the rear building block; and (c) one or more electric drive motors are disposed in one or both of the rear building block and the front building block, wherein each electric drive motor disposed in the front building block is operatively connected to rotate the wheel axel of the front building block and each electric drive motor disposed in the rear building block is operatively connected to rotate the wheel axel of the rear building block.

Further advantageous embodiments, in accordance with the present invention, are recited in additional embodiments as follows. In another embodiment of the invention, the first means for connecting and the second means for connecting each comprise one or more bolts having target break points. In a still further embodiment of the present invention, the first embodiment is further modified so that the first means for connecting and the second means for connecting comprise one or more exploding bolts, each bolt comprising a built-in charge for igniting and blowing off the bolt. In accordance with a further embodiment of the present invention, the first embodiment is further modified so that when the main building block runs over a land mine and the land mine explodes at least one of the wheel axel in the front building block or the wheel axel in the rear building block remains in a remaining portion of the vehicle and continues to operate to drive the remaining portion. In accordance with a still further embodiment of the present invention, the first embodiment is modified to further include a plurality of wheels connected to each wheel axel, wherein the vehicle is constructed so a free space is maintained at right angles above and over each wheel axel and the wheels connected thereto, and each wheel axel of the vehicle is disposed so as not to be positioned under the main building block.

In accordance with a yet another embodiment of the present invention, the main building block has a V-shaped floor. In accordance with another embodiment of the present invention, the main building block comprises a pan housing, and the pan housing comprises a double wall structure and a thin steel plate. In accordance yet another embodiment of the present invention, the pan housing is constructed to define a hollow portion. In accordance with yet another embodiment of the present invention, the first embodiment is further modified so that the main building block comprises a first cabin hung into, and vibrationally coupled with, a housing portion by a plurality of elastic hangers. In accordance with another embodiment of the present invention, the housing portion has a plastically deformable structure. In accordance with still another embodiment of the present invention, the first cabin further comprises a thick walled aluminum material. In accordance with another embodiment of the present invention, the vehicle is reconfigurable by unhanging the first cabin and hanging in a second cabin in place of the first cabin thereby reconfiguring the vehicle.

In accordance with another embodiment of the invention, the first embodiment is further modified so that a first electric drive motor is disposed in the rear building block and the first electric drive motor is connected to an electric generator by a current line; and a second electric drive motor is disposed in the front building block and the second electric drive motor is connected to a battery by a current line. In accordance with a yet another embodiment of the present invention, the combustion motor is disposed in the rear building block and the electric generator is also connected to provide current to the combustion motor. In accordance with still another embodiment of the present invention, the first embodiment is further modified so that a first electric drive motor is disposed in the front building block and the first electric drive motor is connected to an electric generator by a current line; and a second electric drive motor is disposed in the rear building block and the second electric drive motor is connected to a battery by a current line. In accordance with yet another embodiment of the present invention, the combustion motor is disposed in the front building block and the electric generator is also connected to provide current to the combustion motor.

In accordance with still another embodiment of the present invention, the remaining portion of the vehicle includes the main building block connected to the rear building block. In accordance with an yet another embodiment of the present invention, the remaining portion of the vehicle includes the main building block connected to the front building block.

The basic idea in accordance with the present invention is to provide front and rear building blocks with an electrical drive motor, or both an electrical drive motor and a normal, conventional drive motor (i.e., combustion motor). In vehicles with normal conventional drive motors, an internal combustion motor is connected to the wheels of a first vehicle axel, which are driven mechanically by the internal combustion engine. However, in accordance with the present invention, a separate, electrical drive is provided to drive a second vehicle axel. In this way, this additional electromotor can obtain its current from a generator built with the internal combustion engine or from a separate electrical energy producer, or from batteries that are previously charged and store corresponding electrical current energy for a particular mobility use. Even other storage structures that store electrical current energy, such as high capacity capacitors, can be utilized to provide power for the electro-motors used in the present invention. Such hybrid drives are, for example, known from German Document DE 197 18 709 A1. However, in accordance with the present invention, it is provided that one drive system (i.e., the drive system of a front building block) replaces the other drive system (i.e., conventional drive system in the rear building block) when the other drive system has fallen out, been destroyed, or becomes inoperative. In this way, the vehicle, in accordance with the present invention, maintains a residual mobility in dangerous situations so that a crew in the vehicle can independently distance the damaged vehicle from the direct danger region of a mine trap (i.e., either secondary explosive devices of a single mine or from a mine field). Thus, by use of two electrical drives, one in the front region of the vehicle next to the front axel and the steering, and one in the rear region provided next to the rear axel, the vehicle is provided with separately operable electrical drive motors for rotating and driving each one of the front axel and the rear axel, respectively. This dual construction has the advantage that a front motor and a rear motor can be driven simultaneously so that a redundant drive is produced and, at the same time, a residual mobility can also be secured for use when one of the drives is damaged or destroyed.

For achieving an improved protective effect against the damaging effects of exploding mines, the vehicle in accordance with the present invention is divided into several separable building blocks that are separably connected with one another. Such a vehicle, in accordance with the present invention, includes a middle building block, the so-called "main building block," as well as a front building block or part and a rear building block or part. The rear and front parts can be flanged onto the middle building block by means of explosive bolts so as to be separably fastened together. Each explosive bolt can be ignited by means of a built-in charge and thereby blown off. In the alternative, the connection of the building blocks can be achieved by using bolts with target breaking points instead. The front and rear wheel axels are preferably rotatably connected to the front and rear building blocks, respectively, and positioned so that these axels do not lie under the crew space.

The actual crew space, is, in accordance with an embodiment of the present invention, designed as a cabin or protection cell in the vehicle housing, and is hung up in, and vibrationally decoupled to, the main building block. The support structure, therefore, is constructed to be plastically deformable, and a V-shaped underbody is formed without breakthroughs (i.e., doors) that could permit explosive energy to travel into the cabin. Additionally, the main building block is provided with an elastic suspension system in the roof region, which includes plastically-deformable, energy-absorbing thin-walled, hollow profiles so as to provide an energy dissipating structure.

A space formed inside of the main building block, between the V-shaped bottom of the support structure and the flattened lower portion of the cabin, can serve to contain the drive shaft and/or cable.

Thus, the building blocks of the vehicle are so constructed that mine explosions have a minimal destructive effect.

Furthermore, it is possible by simply unhanging one cabin to reconfigure the vehicle of the present invention by simply hanging on another cabin in the main building block. This interchangeable structure simplifies the reequipping of the main building block to include a cabin that transforms the vehicle into a new version of the vehicle. For example, a vehicle required for scouting missions may be equipped with a cabin configured for scouting missions, whereas a cabin used for crowd control and disbursement missions may replace the scouting cabin, thereby reconfiguring a scouting vehicle into a vehicle suitable for military police missions.

Thus, a military wheeled vehicle with high mine protection is achieved by providing each wheel axel of the vehicle with its own drive, and the vehicle construction is preferably divided into multiple building blocks. In particular, constructing the vehicle into at least three building blocks, (i.e., a front building block, a main building block and a rear building block) provides residual mobility for the vehicle when either the front building block or the rear building block, or a portion thereof, is separated (i.e., blown off or destroyed) after running over and detonating a mine by the main building block.

Other objects, features and advantages of the present invention will become apparent from the Detailed Description of Preferred Embodiments, which follows, when considered together with the attached drawings.

BRIEF DESCRIPTION OF THE DRAWINGS

Exemplary embodiments of the invention are schematically shown in the drawings and are more closely described as follows.

DETAILED DESCRIPTION OF ILLUSTRATIVE EMBODIMENTS

Figure 1:
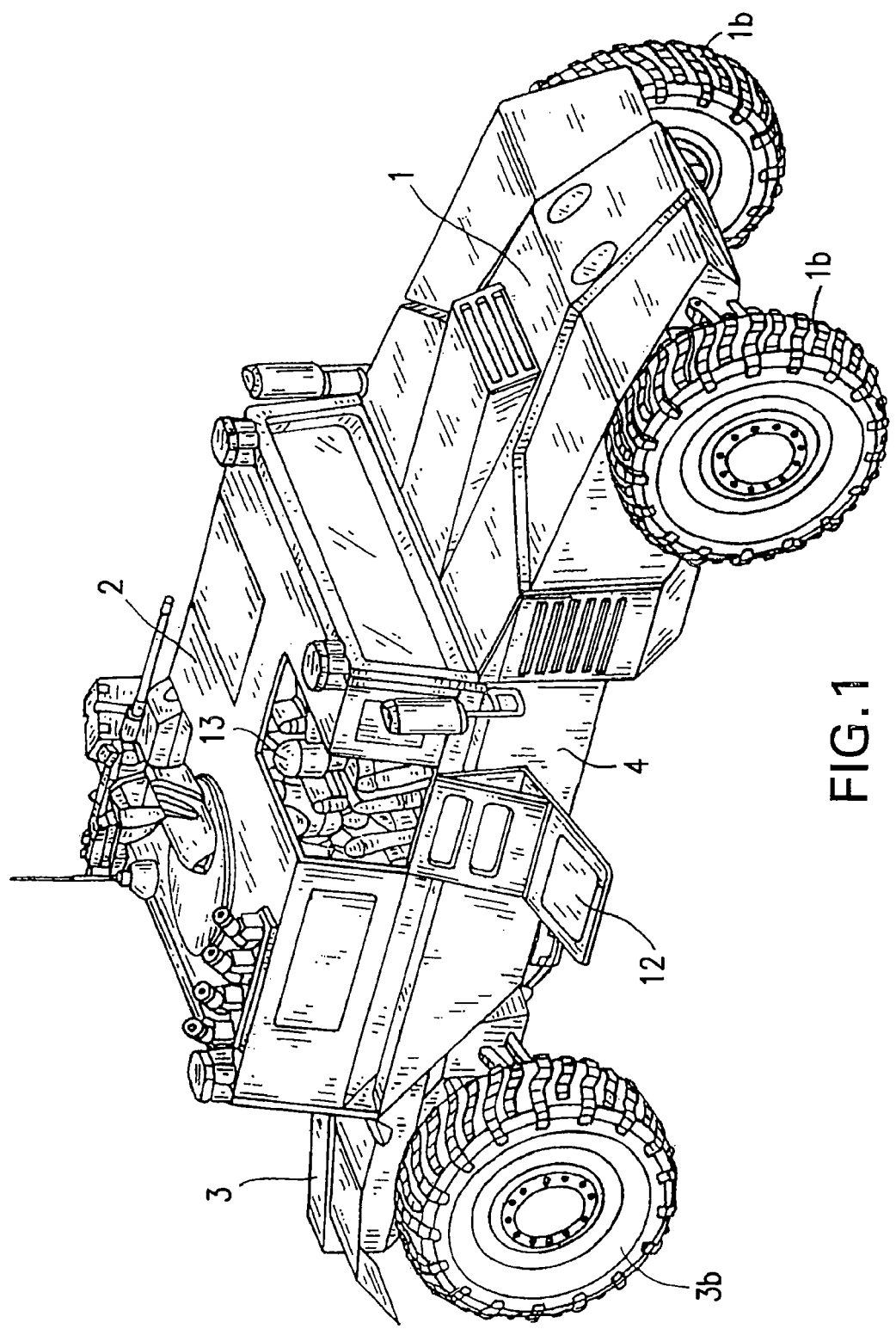
FIG. 1 is a prospective view of an exemplary vehicle embodiment in accordance with the present invention.

The non-limiting apparatus embodiments of the present invention are described with reference to the Figures, wherein like parts are numbered by like reference numbers. In FIG. 1 there is shown a two-axeled exemplary vehicle 4 according to the present invention constructed with several building blocks, including front building block 1, main building block 2 and rear building block 3. Reference numeral 12 represents an exit for a crew indicated by 13. Vehicle 4, for example, is a military armored personnel vehicle, a humvee, a jeep, or other vehicle equipped for a military or police mission.

Figure 2:
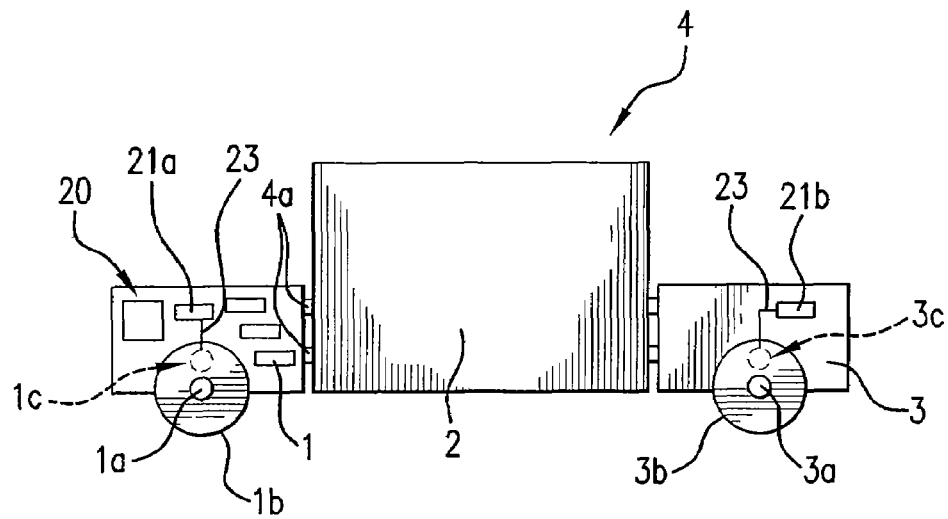
FIG. 2 shows a schematic side view of a vehicle embodiment in accordance with the present invention.

The vehicle 4, as shown in FIG. 2 from the side, includes the front building block 1, which is shown here as the motor building block, which includes a combustion motor 20 for primarily propelling the vehicle 4 when intact. The front building block also includes a wheel axel 1a connected with a right and left front wheels 1b. The main building block 2, referred to here as the "crew building block," includes wheel axel 3a connected with a right and left rear wheels 3b (only one shown). The wheel axels 1a and 3a are preferably not disposed, as usual, under the crew building block 2, but are positioned on their respective building blocks 1 and 3 so as to be separatable from the crew building block 2. Motor building block 1 and rear building block 3 are flanged onto the sides of crew space building block 2 in a loosenable, or detachable, manner by the schematically-indicated bolts/explosive bolts 4a that provide a means for connecting, or by some other equivalent connection member or means of connecting. The front building block 1 also includes a steering assembly (not shown) connected to steer the front wheels 1b, a drive motor 1c, a combustion motor 20, and a flanged-on current producer 21a that is a generator in this case. The current producer, or electric generator, 21a is connected to power the drive motor 1c, which is preferably an electric motor. The current producer 21a may be an electric battery.

A drive motor 3c is also provided in the rear building block 3. The rear building block 3 additionally includes a current producer, or electric generator, 21b that is connected to provide electric power to the drive motor 3c. The current supply of generator 21a to the drive motor 1c and the current supply of battery 21b to drive motor 3c occurs conventionally over current lines 23.

In all of the embodiments described herein of vehicle 4, a free space is maintained at right angles above the wheels 1b, 3b. In other words, the space above the wheels 1b and 3b is free of any portion of the crew building block 2.

Figure 3:
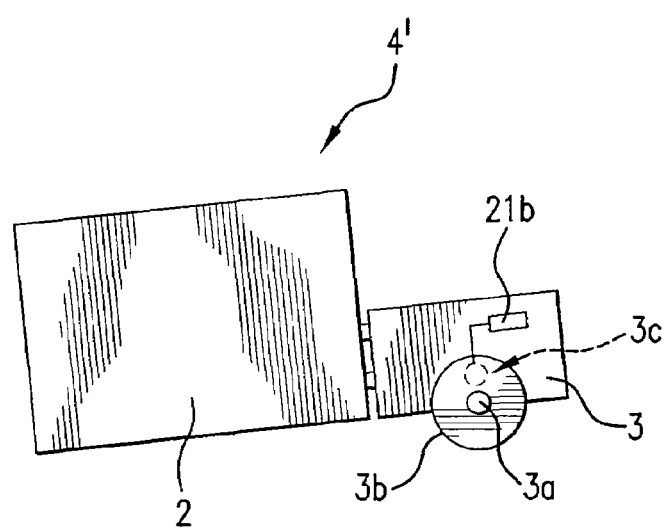
FIG. 3 provides a schematic representation of a vehicle, in accordance with the present invention, in side view after running over a mine.

In FIG. 3, a portion 4' of the vehicle 4 is schematically illustrated, wherein portion 4' represents the remaining portion of vehicle 4 after vehicle 4 has been hit, for example, by running over a mine. In the situation shown in FIG. 3, the front building block 1, being a separable portion of the vehicle 4, has been blown off from main building block 2. The remaining portion 4' has, however, its own drive 3c that enables the remaining vehicle portion 4' to have residual mobility (i.e., still be able to propel itself to move along the ground).

Figure 4:
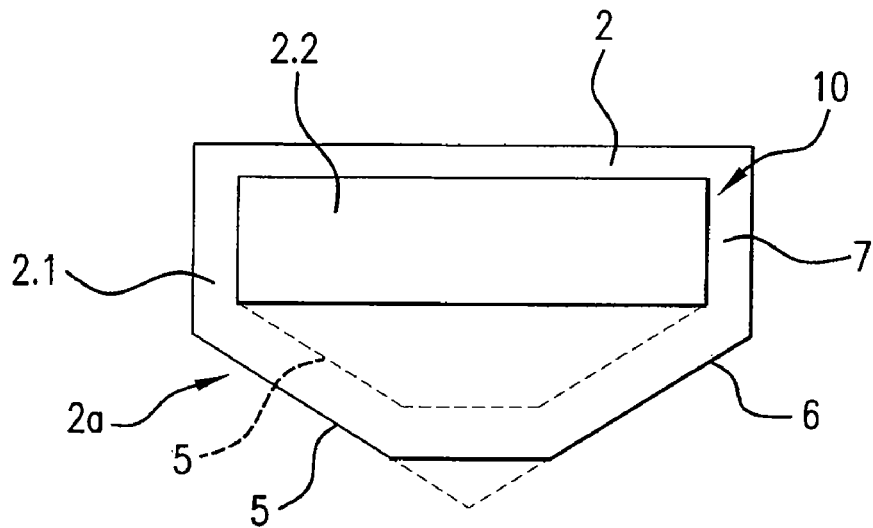
FIG. 4 is a cross sectional view of a crew security cell in accordance with the present invention.

In FIG. 4, the main building block 2 illustrated in FIG. 3 (or alternatively in FIG. 1) is shown in cross section to have a diagonal floor 6. Diagonal floor 6 is constructed with a double wall 5 so as to include a hollow profile 7. The main building block 2, therefore, includes an outer region 2.1 and an inner region 2.2. The outer region 2.1 is formed as a pan 2a having a V-shape (shown in phantom in FIG. 4), or a substantially V-shape, toward the bottom. With regards to the inner region 2.2, the actual crew space is completely sealed by means of a cabin or security cell (9 and 11) formed by a lower portion 9 and an upper portion or roof 11. The cabin or security cell (9 and 11) is disposed to hang up in the housing portion 10 of the main building block 2 and is fastened to the upper edge 2.3 of the outer region 2.1 of the main building block 2.

Figure 5:
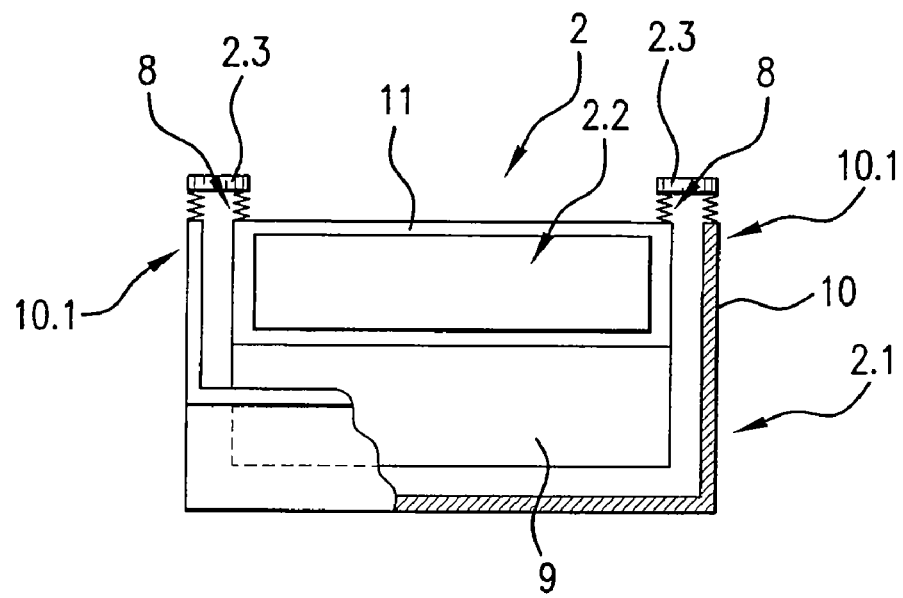
FIG. 5 is a side view of the suspended security cell.

FIG. 5 illustrates the principle of a suspended cabin (9 and 11), wherein the cabin (9 and 11) is suspended up in housing portion 10 using elastic hangers 8. The housing portion 10 is a plastically-deformable support structure, or at least includes a plastically-deformable support structure. The material from which cabin (9 and 11) is constructed is preferably aluminum in order to catch secondary shrapnel (i.e., shrapnel originating from damaged portions of the vehicle 4).

Next, how the energy of a shock wave generated by an exploding mine is transmitted through, and dissipated by, the structure of a separatable multi-block vehicle 4, made in accordance with the present invention, will be described. During a mine explosion, when a mine (not shown) explodes and the shock wave generated strikes a wheel 1b, for example, both wheels 1b can loosen from the vehicle 4 and fly upward. In such a situation, for example, the vehicle 4 is constructed so that the entire front building block 1 can rip off, or be blown off, from the remaining vehicle portion 4' (See FIG. 3).

In the scenario just described, preferably, the entire axel 1a, the wheels 1b, and the drives 20 and 1c are separated from the remaining portion 4' of vehicle 4 without striking the bottom surface or portion of building block 2 because the building blocks 1, 2, 3 have been constructed to include vertical separation lines. Thus, the remaining explosive impulse thereafter flowing into the middle main building block 2 is transformed into deformation energy by the double walled construction 5 of the lower region or portion of the building block 2. Thereafter, any remaining energy from the explosive impulse strikes the thin-walled supports 10.1 in the upper region or portion of the building block 2. When the explosive impulse strikes the thin-walled supports 10.1, they contract. Lastly, any thereafter-remaining residual energy from the explosive impulse strikes, or is transmitted to, the elastic carriers or hangers 8 in the roof 11 of the cabin (9 and 11). At this point in the movement of the explosive impulse, the impulse wave has become so long and flat that mechanical springs, or the like, can be utilized to dissipate the remaining energy. Thus, the remaining impulse energy that flows over these springs into the roof of cabin 9, 11 is sufficiently damped that it no longer significantly injures the crew. Advantageously, by means of the remaining drive 3c (or, if the rear building block 3 is separated by means of drive 1c in combination with the combustion motor 20) the crew of the vehicle 4 can bring the rest of the vehicle 4' independently out of the danger zone into safety.

It should be understood by those persons of ordinary skill in the art that it is within the scope of the present invention to construct the front and/or rear building blocks 1 and 3 to also have diagonal floors that correspond to the diagonal floor 6 of the main building block 2. Furthermore, it should be understood that when a mine explodes generating a shock wave striking a wheel 3b, instead of a wheel 1b, then both wheels 3b can loosen from the vehicle 4 and fly upward. In such a situation, the vehicle 4 is constructed so that the entire rear building block 3 can rip off, or be blown off, from the remaining vehicle portion (i.e., main building block 2 connected to front building block 1).

Under these circumstances, the remaining vehicle portion would include the main building block 2 connected to the front building block 1, and it is the rear building block 3, along with wheels 3b, axel 3a, drive motor 3c and current producer 21b, that separates from the remaining vehicle portion (i.e., main building block 2 and front building block 1) due to the impulse of the impacting explosive shock wave. In this case, the remaining vehicle portion comprising the front building block 1 and the main building block 2 advantageously retains residual mobility because the drive 1c and/or the conventional drive 20 still operates to rotate the axel 1a and wheels 1b. Consequently, the drive 1c and/or conventional drive 20 can be used to propel the remaining vehicle portion (i.e., main building block 2 and front building block 1) along the ground surface and to safety.

The previous description relates to a two-axeled vehicle 4. The concept of a multiple block vehicle according to the present invention can also be developed for multi-axeled vehicles (i.e., 3-axeled vehicles, 4-axeled vehicles, and so on). Within the scope of the present invention, such multi-axeled vehicles are subdivided into multiple building blocks that are separable from one another in a manner as described herein for the 2-axel vehicle. The subdivision can also be carried out within the front building block 1 or rear building block 3 so the front building block and/or the rear building block would include separable blocks or portions. For example, the multi-axel vehicle can be constructed so that each wheel axel of the multi-axel vehicle is provided with a drive motor and represents its own separable segment capable of effecting residual mobility.

While the present invention has been described with reference to certain illustrative embodiments, one of ordinary skill in the art will recognize that additions, deletions, substitutions, modifications and improvements can be made while remaining within the scope and spirit of the present invention as defined by the appended claims.

Reference Numeral List:
1—Front or Motor Building Block;
1a—Wheel Axel;
1b—Wheel;
2—Main Building Block, Crew Space Building Block;
2.1—Outer Region;
2.2—Inner Region;
2a—Pan;
3—Rear Building Block;
3a—Wheel Axel;
3b—Wheel;
4—Vehicle;
4a—Bolt/Exploding Bolt;
5—Double Walled Structure of Floor;
6—Slanted Floor;
7—Hollow Profile;
8—Elastic Hanger;
9—Lower Portion of Security Cell;
10—Housing Portion;
11—Upper Portion of Security Cell;
20—Internal Combustion Engine;
21—Generator;
22—Battery;
23—Current Supply Lines.

What is claimed is:

1. An armored wheeled vehicle with protection against effects of a land mine, comprising:
 (a) multiple building blocks including:
  i. a front building block having at least one wheel axel;
  ii. a rear building block having at least one wheel axel; and
  iii. a main building block, wherein the front building block is releasably fastened by first means for connecting to a front portion of the main building block and the rear building block is releasably fastened to a rear portion of the main building block by second means for connecting to the main building block, wherein the first means for connecting and the second means for connecting each comprise one or more bolts having target break points;
 (b) a combustion motor operatively connected to rotate at least one of the wheel axel of the front building block and the wheel axel of the rear building block, wherein the combustion motor is disposed in either the front building block or the rear building block; and
 (c) one or more electric drive motors are disposed in one or both of the rear building block and the front building block, wherein each electric drive motor disposed in the front building block is operatively connected to rotate the wheel axel of the front building block and each electric drive motor disposed in the rear building block is operatively connected to rotate the wheel axel of the rear building block.

2. A vehicle according to claim 1, wherein when the main building block runs over a land mine and the land mine explodes at least one of the wheel axel in the front building block or the wheel axel in the rear building block remains in a remaining portion of the vehicle and continues to operate to drive the remaining portion.

3. A vehicle according to claim 1, further comprising a plurality of wheels connected to each wheel axel, wherein the vehicle is constructed so a free space is maintained at right angles above and over each wheel axel and the wheels connected thereto, and each wheel axel of the vehicle is disposed so as not to be positioned under the main building block.

4. A vehicle according to claim 1, wherein the main building block has a V-shaped floor or a substantially V-shaped floor.

5. A vehicle according to claim 1, wherein the main building block comprises a pan housing, and the pan housing comprises a double wall structure and a thin steel plate.

6. A vehicle according to claim 5, wherein the pan housing is constructed to define a hollow profile.

7. A vehicle according to claim 1, wherein the main building block comprises a first cabin hung into, and vibrationally coupled with, a housing portion by a plurality of elastic hangers.

8. A vehicle according to claim 5, wherein the housing portion has a plastically deformable structure.

9. A vehicle according to claim 5, wherein the first cabin further comprises a thick walled aluminum material.

10. A vehicle according to claim 5, wherein the vehicle is reconfigurable by unhanging the first cabin and hanging in a second cabin in place of the first cabin thereby reconfiguring the vehicle.

11. A vehicle according to claim 1, wherein a first electric drive motor is disposed in the rear building block and the first electric drive motor is connected to an electric generator by a current line; and a second electric drive motor is disposed in the front building block and the second electric drive motor is connected to a battery by a current line.

12. A vehicle according to claim 11, wherein the combustion motor is disposed in the rear building block and the electric generator is also connected to provide current to the combustion motor.

13. A vehicle according to claim 1, wherein a first electric drive motor is disposed in the front building block and the first electric drive motor is connected to an electric generator by a current line; and a second electric drive motor is disposed in the rear building block and the second electric drive motor is connected to a battery by a current line.

14. A vehicle according to claim 13, wherein the combustion motor is disposed in the front building block and the electric generator is also connected to provide current to the combustion motor.

15. A vehicle according to claim 2, wherein the remaining portion of the vehicle includes the main building block connected to the rear building block.

16. A vehicle according to claim 2, wherein the remaining portion of the vehicle includes the main building block connected to the front building block.

17. An armored wheeled vehicle with protection against effects of a land mine, comprising:

(a) multiple building blocks including:
  i. a front building block having at least one wheel axel;
  ii. a rear building block having at least one wheel axel; and
  iii. a main building block, wherein the front building block is releasably fastened by first means for connecting to a front portion of the main building block and the rear building block is releasably fastened to a rear portion of the main building block by second means for connecting to the main building block, wherein the first means for connecting and the second means for connecting comprise one or more exploding bolts, each bolt comprising a built-in charge for igniting and blowing off the bolt;

(b) a combustion motor operatively connected to rotate at least one of the wheel axel of the front building block and the wheel axel of the rear building block, wherein the combustion motor is disposed in either the front building block or the rear building block; and (c) one or more electric drive motors are disposed in one or both of the rear building block and the front building block, wherein each electric drive motor disposed in the front building block is operatively connected to rotate the wheel axel of the front building block and each electric drive motor disposed in the rear building block is operatively connected to rotate the wheel axel of the rear building block.

18. An armored wheeled vehicle with protection against effects of a land mine, comprising:

(a) multiple building blocks including:
  i. a front building block having at least one wheel axel;
  ii. a rear building block having at least one wheel axel; and
  iii a main building block, wherein the front building block is releasably fastened by first means for connecting to a front portion of the main building block and the rear building block is releasably fastened to a rear portion of the main building block by second means for connecting to the main building block;

(b) a combustion motor operatively connected to rotate at least one of the wheel axel of the front building block and the wheel axel of the rear building block, wherein the combustion motor is disposed in either the front building block or the rear building block; and (c) one or more electric drive motors are disposed in one or both of the rear building block and the front building block, wherein each electric drive motor disposed in the front building block is operatively connected to rotate the wheel axel of the front building block and each electric drive motor disposed in the rear building block is operatively connected to rotate the wheel axel of the rear building block, and wherein the main building block comprises a first cabin hung into, and vibrationally coupled with, a housing portion by a plurality of elastic hangers and the housing portion has a plastically deformable structure.

* * * * *